A. SHERWOOD.
Corn-Shellers.

No. 150,365. Patented April 28, 1874.

WITNESSES:
P. C. Dittrich
Fred Kiescher

INVENTOR.
Allen Sherwood
per J. H. Alexander
ATTORNEY.

UNITED STATES PATENT OFFICE.

ALLEN SHERWOOD, OF AUBURN, NEW YORK.

IMPROVEMENT IN CORN-SHELLERS.

Specification forming part of Letters Patent No. 150,365, dated April 28, 1874; application filed March 27, 1874.

*To all whom it may concern:*

Be it known that I, ALLEN SHERWOOD, of Auburn, in the county of Cayuga and State of New York, have invented certain new and useful Improvements in Corn-Shellers; and I do hereby declare that the following is a full, clear, and exact description thereof, reference being had to the accompanying drawings, and to the letters of reference marked thereon, which form part of this specification.

My invention relates to that class of corn-shellers which have a segmental casing with spout underneath, and hopper at the top, and a revolving plate on one side, forming part of the casing and shelling the corn; and the nature of my invention consists in a bearing formed on the hub attached to the mill, for the disk-plate to play upon, and also in constructing the said bearing or hub hollow for the insertion of a bolt, with a spring upon the end of the bolt to allow the plate to adjust itself to the size of the ear.

In order to enable others skilled in the art to which my invention appertains to make and use the same, I will now proceed to describe its construction and operation, referring to the annexed drawing, in which—

Figure 1:
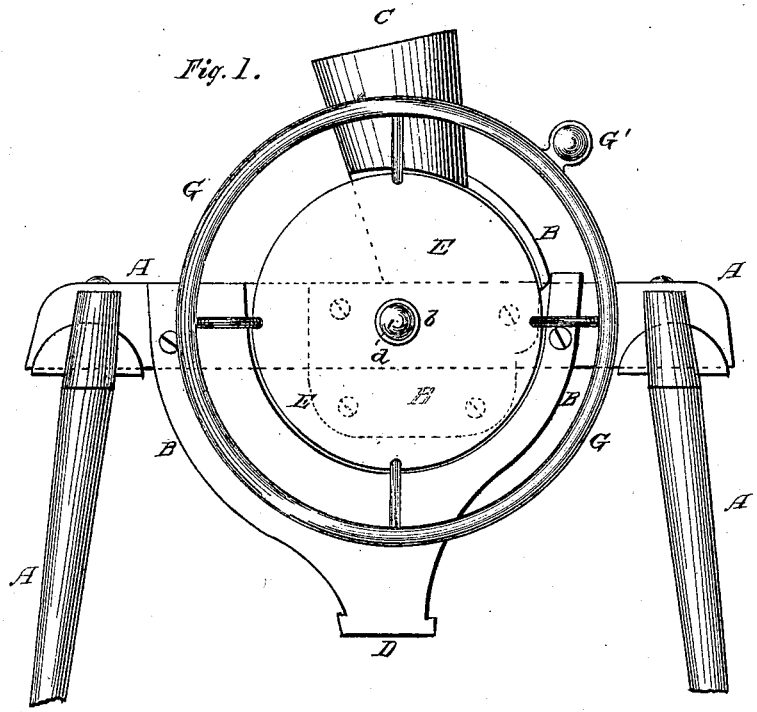
Figure 2:
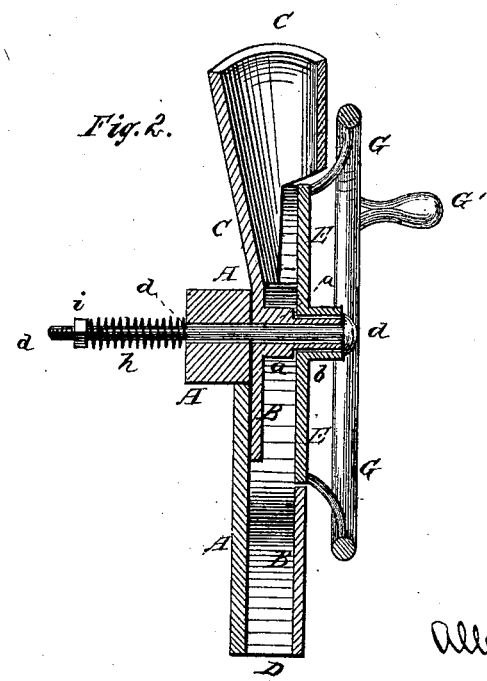

Figure 1 is a front elevation, and Fig. 2 a central vertical section.

A represents a suitable frame-work, to which the casing B is attached. C is the hopper in which the ear of corn is inserted to be shelled, and D is the spout through which the shelled corn falls out. Inside of the casing B is attached a hub, $a$, the end of which is turned down smaller to form a journal or bearing for the disk-plate E, which forms a part of the side of the casing, and revolves upon said bearing. To the plate E is, by suitable arms, connected a balance or fly wheel, G, having a crank, G', attached to it, by means of which the plate is revolved. The hub, or, more properly speaking, the bearing or journal part thereof, is elongated, and in the center of the plate E is an outward-projecting sleeve, $b$, around said journal. The hub $a$, with the elongated bearing, is made hollow, and a bolt, $d$, is passed entirely through the same, the head of said bolt being sufficiently large to form a stop for the end of the hub or sleeve $b$ in the plate E. Upon the other end of the bolt is placed a spiral spring, $h$, confined by means of a nut, $i$. This spring allows the plate to yield and adjust itself to the size of the ear of corn passing through the machine.

Having thus fully described my invention, what I claim as new, and desire to secure by Letters Patent, is—

1. The hub $a$ inside the mill, and formed with an elongated journal or bearing, extending across and beyond the mill, for the disk-plate E to revolve and play upon, as herein set forth.

2. The hollow hub $a$, formed with hollow elongated bearing, in combination with the disk E, bolt $d$, spring $h$, and nut $i$, substantially as and for the purposes herein set forth.

In testimony that I claim the foregoing as my own I affix my signature in presence of two witnesses.

ALLEN SHERWOOD.

Witnesses:
 CLARENCE SHERWOOD,
 HORACE T. COOK.